US010498791B2

(12) United States Patent
Badulescu et al.

(10) Patent No.: US 10,498,791 B2
(45) Date of Patent: Dec. 3, 2019

(54) NEGOTIATION OF MESSAGE CHUNK SIZE FOR MESSAGE SESSION RELAY PROTOCOL SESSION (71) Applicants: Cristina Badulescu, Roxboro (CA); Nancy M. Greene, Outremont (CA); Patrice Varinot, Outremont (CA)

(72) Inventors: Cristina Badulescu, Roxboro (CA); Nancy M. Greene, Outremont (CA); Patrice Varinot, Outremont (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 448 days.

(21) Appl. No.: 14/910,159

(22) PCT Filed: Dec. 21, 2015

(86) PCT No.: PCT/IB2015/059851
§ 371 (c)(1),
(2) Date: Feb. 4, 2016

(87) PCT Pub. No.: WO2016/098086
PCT Pub. Date: Jun. 23, 2016

(65) Prior Publication Data
US 2016/0352795 A1 Dec. 1, 2016

Related U.S. Application Data (60) Provisional application No. 62/094,227, filed on Dec. 19, 2014.

(51) Int. Cl.
G06F 15/16 (2006.01)
H04L 29/06 (2006.01)
(Continued)

(52) U.S. Cl.
CPC .......... *H04L 65/602* (2013.01); *H04L 51/04* (2013.01); *H04L 65/1006* (2013.01);
(Continued)

(58) Field of Classification Search
CPC ... H04L 65/602; H04L 51/04; H04L 65/1006; H04L 65/1069; H04W 4/50; H04W 4/001; H04W 4/12
(Continued)

(56) References Cited

U.S. PATENT DOCUMENTS

2005/0243746 A1* 11/2005 Mutikainen ......... H04L 65/1069
370/282
2006/0274728 A1* 12/2006 Leppisaari .............. H04L 51/04
370/352
(Continued)

FOREIGN PATENT DOCUMENTS

EP 1672866 A1 * 6/2006 .......... H04M 7/0024
EP 1672866 A1 * 6/2006 .......... H04M 7/0024
(Continued)

OTHER PUBLICATIONS

GSM Association, IR.90—RCS Interworking Guidelines, Version 6.0, Aug. 10, 2013, pp. 1-42.
(Continued)

*Primary Examiner* — John B Walsh
(74) *Attorney, Agent, or Firm* — David J Rahmer; Ericsson Canada Inc.

(57) ABSTRACT

Embodiments of the invention relates to methods, and apparatuses for exchanging the preferred MSRP chunk sizes between an end-point and a remote end-point, directly or via a server using SDP offer/answer mechanism. The preferred MSRP chunk size may be the maximum allowed MSRP chunk size for the end-point and may be determined in accordance with network/link conditions and/or internal
(Continued)

configuration. The end-point uses its preferred MSRP chunk size and the received preferred MSRP chunk size of the remote end-point to determine the MSRP chunk size that will be used to segment the messages from the end-point to the remote-end-point over the MSRP session. The preferred MSRP chunk size can be renegotiated during an ongoing MSRP session.

14 Claims, 6 Drawing Sheets (51) Int. Cl.
*H04W 4/50* (2018.01)
*H04L 12/58* (2006.01)
*H04W 4/12* (2009.01)

(52) U.S. Cl.
CPC .......... *H04L 65/1069* (2013.01); *H04W 4/12* (2013.01); *H04W 4/50* (2018.02)

(58) Field of Classification Search
USPC ........................................................ 709/217
See application file for complete search history.

(56) References Cited

U.S. PATENT DOCUMENTS

| | | | | |
|---|---|---|---|---|
| 2007/0124415 | A1* | 5/2007 | Lev-Ran | H04L 51/063 709/217 |
| 2008/0043717 | A1* | 2/2008 | Bellora | H04M 7/0027 370/352 |
| 2008/0052406 | A1* | 2/2008 | Kong | H04L 65/1069 709/237 |
| 2008/0160906 | A1* | 7/2008 | Ranjan | H04H 60/80 455/3.01 |
| 2008/0307062 | A1* | 12/2008 | Wang | H04L 51/04 709/206 |
| 2009/0075684 | A1* | 3/2009 | Cheng | H04L 51/30 455/466 |
| 2010/0077057 | A1* | 3/2010 | Godin | H04L 65/4038 709/218 |
| 2011/0103372 | A1* | 5/2011 | Shatsky | H04L 65/1016 370/352 |
| 2011/0150203 | A1* | 6/2011 | Stille | H04M 3/42017 379/207.16 |
| 2012/0089693 | A1* | 4/2012 | Lu | H04L 69/24 709/206 |
| 2012/0117177 | A1* | 5/2012 | Lu | H04L 51/36 709/206 |
| 2012/0131114 | A1* | 5/2012 | Lu | H04L 12/6418 709/206 |
| 2012/0191787 | A1* | 7/2012 | Huang | H04L 29/12613 709/206 |
| 2013/0013802 | A1* | 1/2013 | Edelman | H04L 47/10 709/231 |
| 2015/0358388 | A1* | 12/2015 | Devdas | H04L 67/06 709/219 |

FOREIGN PATENT DOCUMENTS

| | | | | |
|---|---|---|---|---|
| EP | 2023570 | A1 * | 2/2009 | ............ H04L 51/30 |
| EP | 2023570 | A1 | 2/2009 | |
| WO | WO 2006064347 | A1 * | 6/2006 | .......... H04M 7/0024 |
| WO | WO-2006064347 | A1 * | 6/2006 | .......... H04M 7/0024 |

OTHER PUBLICATIONS

International Search Report from corresponding application PCT/IB2015/059851.
GSM Association, RCC.07—Rich Communication Suite 5.2 Advanced Communications Services and Client Specification, Version 5.0, May 7, 2014, pp. 1-551.
OMA Open Mobile Alliance, CPM Conversation Functions, Draft Version 2.0, OMA-TS-CPM_Conv_Fnct-V2_0-20141202-D, Dec. 2, 2014, pp. 1-175.
B. Campbell et. al, The Message Session Relay Protocol (MSRP), Network Working Group, RFC 4975, Sep. 2007, pp. 1-63.
C. Jennings et al., Relay Extensions for the Message Session Relay Protocol (MSRP), RFC 4976, Sep. 2007, pp. 1-36.

* cited by examiner

Figure 3 Method at an End-Point

Figure 4 Method at a Server (e.g., B2BUA)

Figure 5 End-point device

Figure 6 Server

Figure 7 End-point device

NEGOTIATION OF MESSAGE CHUNK SIZE FOR MESSAGE SESSION RELAY PROTOCOL SESSION

CROSS REFERENCE TO RELATED APPLICATIONS

This application claims the benefit of priority to previously filed U.S. Provisional Patent Application No. 62/094,227 entitled "Negotiation of chunk size for Message Session Relay Protocol" and filed on Dec. 19, 2014, the contents of which are incorporated herein by reference.

TECHNICAL FIELD

This disclosure relates generally to negotiation of Message Session Relay Protocol, MSRP chunk size between end-points.

BACKGROUND

The Message Session Relay Protocol, MSRP, is a standard media plane protocol used between end-points through a communication network, for exchanging a series of related instant messages across an Internet Protocol, IP, network in the context of a rendezvous session. It is defined by the Internet Engineering Task Force, IETF, in Request For Comment, RFC 4975. The content in an instant message can be a text message, a Hypertext Transfer Protocol, HTML page, a file containing video clips, images, songs, or just a generic file. The content could also be related to sharing remote desktops or whiteboards.

MSRP is a text-based protocol that is carried on a media plane, over transport protocols such as Transport Control Protocol, TCP, IETF RFC 793, Stream Control Transmission Protocol, SCTP, IETF RFC 2690, Transport Layer Security, TLS over TCP, IETF RFC 2246, etc. In other words, any transport protocols that offer congestion control. As currently specified, MSRP does not impose a restriction on message size or content type.

MSRP Relays can also be used as defined by the IETF RFC 4976. MSRP Relays are used when one of the end-points is located behind a Network Address Translator, NAT, more specifically if the MSRP session has to span across multiple administrative domains. MSRP Relays are also used to support bulk messaging, and carry messages for a large number of MSRP sessions through a small number of inter-relay connections.

MSRP messages consist of requests and responses and not every MSRP request is answered by an MSRP response. MSRP defines methods and there are currently three specified methods:
  SEND method for sending an instant message or file of any arbitrary length, etc.
  REPORT method to provide message delivery notifications.
  AUTH method used to authenticate an end-point with a Relay.

MSRP cannot set up sessions on its own, and in order to establish an MSRP session between end-points, the MSRP session is negotiated via an external rendezvous mechanism. Typical rendezvous mechanism used to establish an MSRP session is Session Initiation Protocol, SIP, with Session Description Protocol, SDP offer/answer model. Other rendezvous protocols can of course be used and are not precluded. Currently, Session Initiation Protocol, SIP, IETF RFC 3261, and Session Description, SDP offer/answer, IETF RFC3264, are the only known standardized mechanism for establishing an MSRP session. SIP is an IETF standard protocol that allows for the establishment of interactive user sessions involving multimedia elements such as video, voice, chat, gaming, and virtual reality. It is also used to establish session based messaging sessions, i.e., MSRP sessions, for exchanging instant messages or files. The MSRP session parameters are exchanged in accordance with the SDP answer/offer model.

The following SDP attributes are exchanged between the end-points in an SDP offer/answer exchange via SIP in order to establish an MSRP session:
  Accept Types: contains a list of media types that the end-point is willing to receive.
  Wrapped Types: contains a list of media types that the end-point is willing to receive in an MSRP message with multipart content.
  Max Size: that indicates the maximum number of octets of an MSRP message or the largest message the end-point is willing to receive. Max-size refers to the complete message and not the size of any one chunk. Senders should not exceed the max-size limit for any message sent in the resulting session.
  Path: indicates a series of MSRP devices that must be visited by messages sent in the session, including the final end-point.

Typically an originating end-point 100 hosting a SIP user agent sends to a remote end-point, also hosting a SIP user agent, a SIP INVITE that includes an SDP offer. The SDP offer comprises the message media type and the MSRP URI of the originating end-point 100 in the path attribute. If the remote end-point accepts the invitation, it responds with a 200 OK to acknowledge the choice of media and includes the receiving MSRP URI. At this point the MSRP session is set up and the end-points can start exchanging instant messages or files or the likes. The MSRP session is terminated when either end-point send a SIP BYE request.

Once the MSRP session is set up, the originating end-point 100 sends a SEND request to deliver a complete message, or if the message is very large, the originating end-point 100 could deliver the message in chunks using several SEND requests, where each SEND request contains one chunk of the overall message, a message ID corresponding to the whole message, a Byte-Range header field that identifies the portion of the message carried in the SEND request and the total size of the message. The remote end-point uses the received information to re-assemble the message and determines which chunks belong to which message. The remote end-point re-assembles the chunks into a complete message.

The SEND request may be answered by an MSRP 200 OK from a peer node or endpoint node and/or by a REPORT request from the end-point indicating successful delivery of the complete message. Incremental success REPORT requests may also be generated by the remote end-point as message chunks are received.

Currently, when a message is sent from an originating end-point 100 to a remote end-point, the originating end-point 100 decides on the MSRP chunk size based on for example its internal configuration. The MSRP Relay may also re-segment the MSRP message to a different chunk size than it was received. The re-segmenting performed at the MSRP Relay is typically based on internal configuration.

The determination of the chunk size does not take into account the remote end-point capabilities, the receiving network capabilities and the remote end-point mobility if it moves from a high capacity access network to a lower capacity access network or vice versa or if the network/link conditions in the remote end-point network has changed. This may lead to message chunks that may not be delivered or lack of optimization in delivery of the messages. Although MSRP is carried over a transport protocol that offers congestion control, the originating end-point has no indication as to the optimal chunk size that is acceptable to the remote end-point.

SUMMARY

It is an object of the present invention to obviate or mitigate at least one disadvantage of the prior art by enabling an end-point to negotiate MSRP chunk size with the remote or receiving end-point or with an intermediate server such as a Back to Back User Agent, B2BUA, or Relay. The B2BUA or relay would then negotiate the chunk size with the remote end-point. The originating end-point would then determine the best chunk size to use considering both the originating and the remote end-point or B2BUA restrictions and capabilities including access network type, network and link conditions and configuration.

In one embodiment, an end-point negotiates MSRP chunk size for an MSRP media session with a remote end-point. The end-point determines a preferred MSRP chunk size that it proposes for the MSRP media session and transmits a message that comprises the preferred MSRP chunk size to the remote end-point. When the end-point receives a response message that comprises a remote end-point preferred MSRP chunk size, it will determine an MSRP chunk size to use for the MSRP media session based on both the preferred MSRP chunk size of the end-point and the received remote end-point preferred MSRP chunk size. The end-point would then use the determined MSRP chunk size to segment the message or file or content transferred over the MSRP media session. The remote end-point may be the final destination remote end-point for which the message is intended or an intermediary remote end-point hosted in a server in the network used to forward or relay the message towards the final destination remote end-point.

In one embodiment, the end-point preferred MSRP chunk size and/or the remote end-point preferred chunk size corresponds to maximum allowed chunk size for that end-point.

In a one embodiment, the end-point determines the preferred MSRP chunk size based on the access network type of the end-point in use (e.g., Long Term Evolution LTE™, WiFi™) and/or the local end-point configuration and/or the end-point capability. The preferred MSRP chunk size is encoded in an SDP attribute and exchanged in an SDP offer and SDP answer. The SDP offer and the SDP answer are transmitted using a rendez-vous protocol such as SIP protocol, e.g., using SIP INVITE, SIP 200 OK, SIP RE-INVITE and SIP UPDATE messages, etc.

In another embodiment, the end-point sends in an SDP attribute a list of preferred MSRP chunk sizes that are listed in order of preference or priority.

In one embodiment, the end-point determines the MSRP chunk size to use for the MSRP media session by selecting the smaller of the end-point preferred MSRP chunk size and the remote end-point preferred MSRP chunk size. If the end-point supports only a set of preconfigured chunk sizes and receives a remote end-point preferred MSRP chunk size that is smaller than the end-point preferred MSRP chunk size and which the end-point cannot select and use for the MSRP session, then the end-point selects a configured MSRP chunk size that is closer and lower to the remote end-point preferred MSRP chunk size.

The end-point sends MSRP SEND requests to the remote end-point, each SEND request comprises a chunk of the file or content or message to be sent, and wherein the size of the chunk is according to the MSRP chunk size as determined by the end-point following the negotiation.

In one embodiment, a server is used to negotiate MSRP chunk sizes with the originating end-point, also referred to as first end-point, and the remote end-point, also referred to as second end-point. The server determines the MSRP chunk sizes to be used for an MSRP session between the first (originating) end-point and the server and between the server and the second (remote) end-point as messages are transmitted between the first end-point and the second end-point through the server. The server receives from the first end-point an SDP offer in a first message (e.g., SIP INVITE) comprising the first end-point preferred MSRP chunk size. Prior to forwarding the first message with the SDP offer to the second end-point, the server may use local policy and/or service level agreement between the server and the peer network along the communication path or the network where the second end-point is located to determine the first server preferred MSRP chunk size. The server replaces in the SDP offer the first end-point preferred MSRP chunk size received from the first end-point with the first server preferred MSRP chunk size and forwards the first message with the updated SDP offer towards the second end-point. When the server receives an SDP answer in a second message (e.g., SIP 200 OK) comprising a second end-point preferred MSRP chunk size in an SDP answer attribute, it may use local policy and/or service level agreement between the server and the peer network node along the communication path towards the first end-point to determine a second server preferred MSRP chunk size that would be used between the server and the first end-point. The server then replaces in the SDP answer, the second end-point preferred MSRP chunk size received from the second end-point with the second server preferred MSRP chunk size. The server then forwards the updated SDP answer in the second message towards the first end-point.

In one embodiment, the first server preferred MSRP chunk size may correspond to a maximum MSRP chunk size allowed between the server and the second end-point. Similarly, the second server preferred MSRP chunk size may correspond to a maximum MSRP chunk size allowed between the server and the first end-point In one embodiment, the server determines a first server MSRP chunk size to be used to segment messages from the server to the second end-point based on the second end-point preferred MSRP chunk size and the first server preferred MSRP chunk size. The server may determine the first server MSRP chunk size by selecting the smaller of the first server preferred MSRP chunk size and the second end-point preferred MSRP chunk size. For the MSRP session between the server and the first end-point, the server determines a second server MSRP chunk size based on the first end-point preferred MSRP chunk size and the second server preferred MSRP chunk size. Similarly, the server may determine the second server MSRP chunk size by selecting the smaller of the second server preferred MSRP chunk size and the first end-point preferred MSRP chunk size.

In one embodiment, when the server receives chunks of a large message or a file or other large content from the first end-point destined to the second end-point, the server may store all the message chunks received from the first end-point prior to forwarding the message re-segmented according to the first server MSRP chunk size. Likewise, on the other direction, if the server receives chunks of a large message or a file or other large content from the second end-point, the server may store all the message chunks received from the second end-point prior to forwarding the message re-segmented according to the second server MSRP chunk size. Alternatively, the server sends the message chunks re-segmented to either end-point as soon as they are received.

In one embodiment, the server sends towards the second end-point a list of first server preferred MSRP chunk sizes in an SDP attribute. The first server preferred MSRP chunk sizes may be listed in order of preference or priority. Another object of the invention consist of providing in an SDP attribute a minimum and a maximum chunk size, hence providing a range of allowed MSRP chunk sizes.

BRIEF DESCRIPTION OF THE DRAWINGS

Embodiments of the present invention will now be described, by way of example only, with reference to the attached Figures, wherein.

DETAILED DESCRIPTION

Acronyms and Definitions:
The following acronyms and terms are used throughout this disclosure
ABNF: Augmented Backus-Naur Form as specified in IETF RFC 5234.
End-point: can be a handheld device, a mobile device such as smartphone or tablet. Alternatively, it may be an Internet of thing, IoT, device, an IP phone, a portable computer, a desktop computer, a gateway or an inter-working function. The end-point supports any media formats such as text, image, audio, video, octet-stream, MIME format etc. and that is capable of using a communication user agent such a SIP user agent or the like for negotiating an MSRP session for the purpose of sending and receiving MSRP messages. The MSRP messages may contain text, files and any type of multimedia content that can be transferred over the established MSRP session. Embodiments presented in this disclosure use originating end-point and remote or receiving end-point. An originating end-point corresponds to the end-point that initiates negotiation of the MSRP session and the remote or receiving end-point corresponds to the end-point with which the MSRP session negotiation is carried out. End-points may negotiate MSRP session parameters directly or via a server in the network. When the server is used, the server acts as an intermediary remote end-point towards the originating end-point and an intermediary originating end-point towards the remote end-point.
IETF: Internet Engineering Task Force.
MSRP: corresponds to Message Session Relay Protocol as specified in IETF RFC 4975.
NNI: Network to Network Interface, which is the interface between two nodes in the network.
OMA: Open Mobile Alliance
RFC: Request For Comment.
Server: Server as used in the described embodiments is defined as a network node or software entity between an originating end-point and a remote or receiving end-point. The server may be an MSRP Back-to-Back User Agent, B2BUA, such as the one described in IETF RFC 6714, a relay such as the one specified in IETF RFC4976, an application messaging server or the like. The server is used to negotiate the MSRP session with each of the originating and the remote or receiving end-points, in which case the server acts as an intermediate remote end-point towards the originating end-point and acts as an intermediate originating end-point towards the remote end-point. All messages between the originating end-point and remote end-point are transmitted through the server.
SDP: Session Description Protocol as specified in IETF RFC3264.
SIP: Session Initiation Protocol as specified in IETF RFC3261.
URI: Uniform Resource Identifier
UNI: User to Network Interface, which is the interface between a user device which also corresponds to an end-point device and a node in the network. An example of a UNI may be an end-point to server (B2BUA) interface when the end-point is a user portable device such as a smartphone or a tablet.

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

Figure 1:
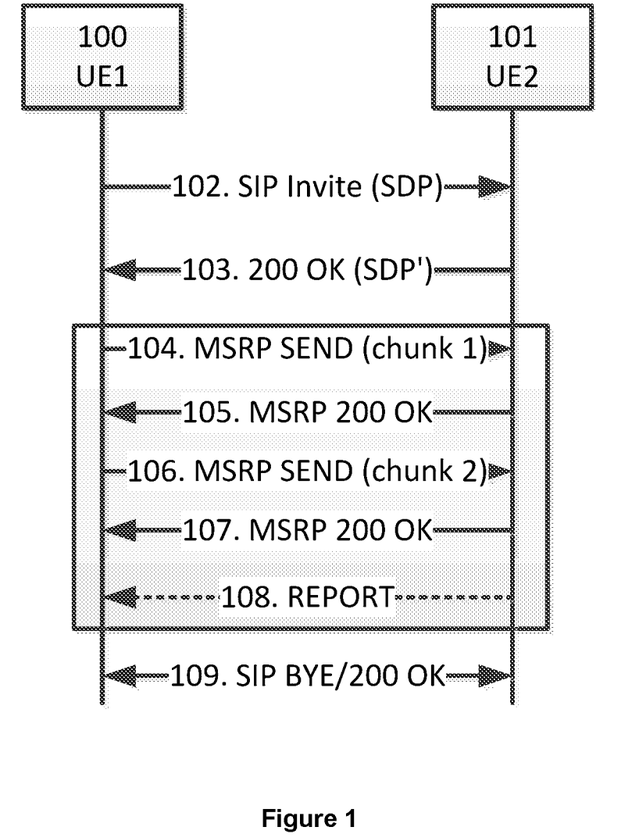
FIG. 1 is an exemplary embodiment of a simplified MSRP session establishment between an originating end-point and a remote end-point.

FIG. 1 illustrates an exemplary embodiment of a simplified MSRP session establishment between an originating end-point 100 and a remote end-point 101 where only the relevant steps are shown. To establish the MSRP session, the originating end-point 100 sends at step 102, a SIP INVITE and includes an SDP offer comprising the well-known Path attribute. If the originating end-point 100 determines that the message or file has to be delivered in chunks, a new SDP attribute indicating the originating end-point preferred chunk size is included in the SDP offer. The originating end-point 100 determines the preferred chunk size at least partially based on the access network type, the access network/access link conditions, internal configuration and/or originating end-point 100 capabilities. Alternatively, the originating end-point 100 may offer a list of preferred chunk sizes. The remote end-point 101 responds with a SIP 200 OK including an SDP answer comprising the well-known path attribute and a new attribute indicating the remote end-point preferred chunk size. Alternatively, the remote end-point 101 may offer a list of its preferred chunk sizes. If the remote end-point preferred chunk size is identical to the originating end-point preferred chunk size, the remote end-point 101 may omit transmitting the remote end-point preferred chunk size in the SDP answer towards the originating end-point 100.

The originating end-point 100 preferred chunk size and the remote end-point preferred chunk size may indicate a maximum chunk size allowed by the end-point for the MSRP session. Additionally, if the SDP attribute contains a list of preferred chunk-size, each chunk size in the list may indicate absolute chunk size value in which case the chunk sizes are listed in order of preference or priority. Optionally, the list may comprise two values indicating a minimum and a maximum chunk size value hence providing an allowable range of chunk sizes that can be used for the MSRP session.

The originating end-point uses the originating end-point preferred chunk size and the remote end-point preferred chunk size to determine the best chunk size to use when sending the message chunks to the remote end-point 101. In a preferred embodiment, the originating end-point 100 selects and uses the smallest of the originating end-point preferred chunk size and the remote end-point preferred chunk size. FIG. 1 shows that the message can be sent in two chunks. Step 104 shows the originating end-point 100 sending the first piece or chunk of the complete message in a SEND request to the remote end-point 101 which responds with an MSRP 200 OK at step 105. The size of the message chunk in the SEND request is the best chunk size for both the originating and remote end-points as determined by the originating end-point 100. At step 106, the originating end-point 100 sends the second and last piece or chunk of the complete message in a second SEND request to the remote end-point 101 which responds with an MSRP 200 OK at step 107. Once the remote end-point 101 determines that all the chunks are received, it optionally sends a REPORT request to indicate successful delivery of the message as shown at step 108. To terminate the MSRP session, the originating end-point 100 sends a SIP BYE message and receives a SIP 200 OK from the remote end-point 101 as shown in bundled step 109.

Figure 2:
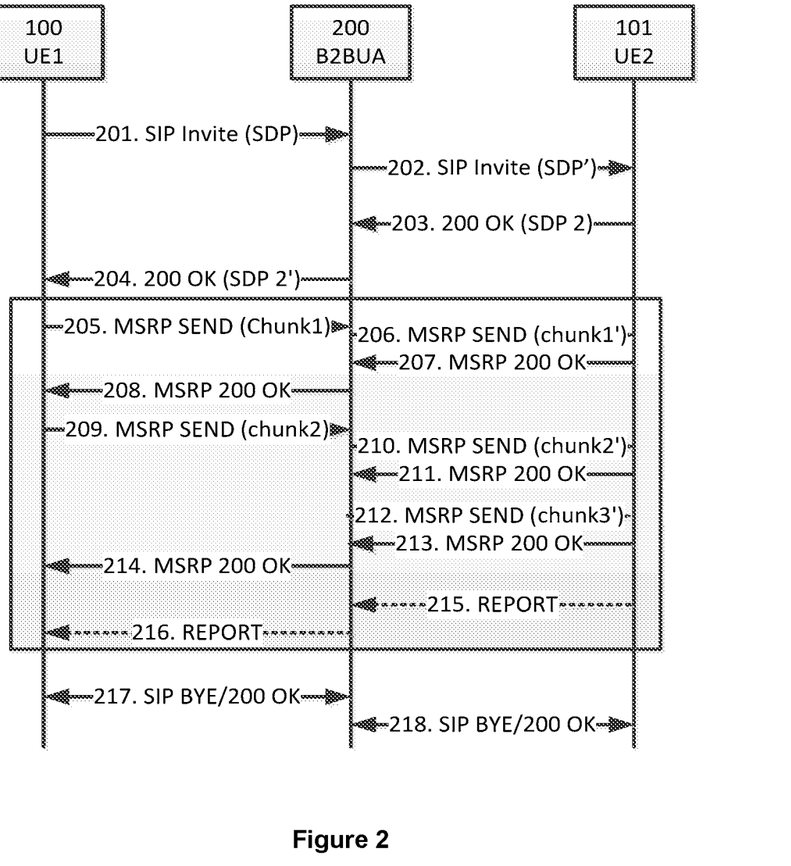
FIG. 2 is an exemplary embodiment of a simplified MSRP session establishment between an originating end-point and a remote end-point via a server such as a B2BUA.

FIG. 2 illustrates an exemplary embodiment of a simplified MSRP session establishment between an originating end-point 100 and a remote end-point 101 through a server, such as a B2BUA 200. Other servers could also be used such as messaging application server or a MSRP Relay. B2BUA 200 is illustrated in FIG. 2. For simplicity FIG. 2 does not show the intermediary nodes such as SIP proxies and Serving Call Session Control Function, S-CSCF. Only the relevant steps between the end-points and the B2BUA 200 are shown. In order to establish the MSRP session through a B2BUA 200, the originating end-point 100 sends a SIP INVITE at step 201 to the remote end-point 101 through a B2BUA 200 and includes an SDP offer comprising the well-known Path attribute. If the originating end-point 100 determines that the message or file has to be delivered in chunks, a new SDP attribute indicating the originating end-point preferred chunk size is included in the SDP offer of a SIP INVITE. Alternatively, the originating end-point 100 may offer a list of preferred chunk sizes in the SDP attribute.

The B2BUA 200 receives the SIP INVITE comprising the new SDP attribute and prior to forwarding or relaying the SIP INVITE to the remote end-point 101 at step 202, the B2BUA 200 determines if the originating end-point preferred chunk size in the SDP attribute should be replaced with its own preferred chunk size. If the B2BUA 200 determines that the originating end-point preferred chunk size should be replaced, then the B2BUA 200 determines its own preferred MSRP chunk size, namely the first server MSRP preferred chunk size to be negotiated with the remote end-point 101. The B2BUA 200 may determine the first server MSRP preferred chunk size in accordance with its internal configuration or network/link condition, capabilities and/or service level agreements toward the remote end-point network. The B2BUA 200 forwards a modified SIP INVITE to the remote end-point 101, where it has replaced the originating end-point preferred chunk size with the first server MSRP preferred chunk size in the SDP offer attribute. Alternatively, the B2BUA 200 may replace the originating end-point preferred chunk size with a list of B2BUA preferred chunk sizes and forwards the SIP INVITE to the remote end-point 101. Upon receiving the modified SIP INVITE comprising the first server MSRP preferred chunk size, the remote end-point 101 may determine its preferred chunk size based on access network type, network condition/link and internal configuration. At step 203, the remote end-point 101 sends a SIP 200 OK to the originating end-point 100 through the B2BUA 200 wherein it includes an SDP answer comprising the well-known path attribute and a new SDP attribute indicating the remote end-point preferred chunk size. Alternatively, the remote end-point 101 may offer a list of preferred chunk sizes in the new SDP attribute.

The B2BUA 200 receives the SIP 200 OK message from the remote end-point. Prior to forwarding or relaying the SIP 200 OK to the originating end-point 100 at step 204, the B2BUA 200 may replace the remote end-point preferred chunk size with a second server MSRP preferred chunk size that it may prefer to use towards the originating end-point 100 in place of the remote end-point preferred chunk size. The B2BUA 200 may determine the second server MSRP preferred chunk size in accordance with its internal configuration, capabilities, network/link condition and/or service level agreements toward the originating end-point 100. The B2BUA 200 sends a modified SIP 200 OK to the originating end-point 100 where it has replaced the remote end-point preferred chunk size with its own, i.e. the second server MSRP preferred chunk size. Alternatively, the B2BUA 200 may replace the remote end-point preferred chunk size with a list of B2BUA preferred chunk sizes prior to forwarding a modified SIP 200 OK to the originating end-point 100. The B2BUA 200 may use different first server and second server MSRP preferred chunk sizes or different lists of B2BUA preferred chunk sizes towards the remote end-point 101 and the originating end-point 100.

For messages sent from the originating end-point 100 towards the remote end-point 101 as illustrated in FIG. 2, the originating end-point 100 uses its preferred chunk size and the second server MSRP preferred chunk size to determine the best chunk size to use when sending the message chunks to the B2BUA 200 towards the remote end-point 101. In one embodiment, the originating end-point 100 selects and uses the smallest of the originating end-point preferred chunk size and the second server MSRP preferred chunk size as the best end-point chunk size.
Best end-point chunk size=Min (the originating end-point preferred chunk size, the server (e.g., B2BUA 200) second MSRP preferred chunk size)

The B2BUA 200 uses the first server MSRP preferred chunk size it has sent to the remote end-point 101 at step 204, and the remote end-point preferred chunk size to determine the best chunk size to use when forwarding the originating end-point 100 message to the remote end-point 101. In one embodiment, the B2BUA 200 selects and uses the smallest of the first server MSRP preferred chunk size and the remote end-point preferred chunk size as the best server chunk size.
Best server chunk size=Min (the remote end-point preferred chunk size, the first server MSRP preferred chunk size)

FIG. 2 illustrates an embodiment where the originating end-point 100 uses the best end-point chunk size to send a complete message to a remote end-point 101 through the B2BUA 200 using two chunks: chunk 1 and chunk 2. B2BUA 200 will forward the complete message received from the originating end-point 100 in three chunks (chunk 1', chunk 2' and chunk 3') towards the remote end-point 101 using the best server chunk size which can also be referred to as first server MSRP chunk size. FIG. 2 illustrates the B2BUA 200 sending the message chunks to the remote end-point 101 as they are received. In the illustrated embodiment, the best end-point chunk size is greater (>) best server chunk size/first server MSRP chunk size, hence Chunk 1' is smaller than chunk 1. The B2BUA 200 would hence need to use more SEND requests towards the remote end-point 101 to forward the message received from the originating end-point 100.

Step 205 shows the originating end-point 100 using the determined best end-point chunk size to send the first piece or chunk1 of the complete message in a SEND request to the B2BUA 200. As chunk 1' is smaller than chunk 1, the B2BUA 200 stores chunk 1 of the message and sends, at step 206, a SEND request to the remote end-point 101 comprising chunk 1' of the message. At step 207, the B2BUA 200 receives an MSRP 200 OK from the remote end-point 101 to acknowledge receipt of chunk 1'. At step 208, the B2BUA 200 sends an MSRP 200 OK to the originating end-point 100 to confirm the reception of the SEND message at step 205. Note that step 208 can occur prior to step 207 or step 206. At step 209, the originating end-point 100 sends the second and last message piece or chunk 2 in a second SEND request to the B2BUA 200. The B2BUA 200 stores the received chunk 2 of the message and determines that chunk2 is the last chunk of the complete message. At step 210, the B2BUA 200 sends a SEND request comprising chunk 2' of the complete message to the remote end-point 101. The remote end-point 101 confirms receiving the SEND request in an MSRP 200 OK message at step 211. At step 212, the B2BUA 200 sends the last SEND request comprising chunk 3' of the complete message to the remote end-point 101. The remote end-point 101 confirms receiving the SEND request with an MSRP 200 OK message at step 213. Note that the B2BUA 200 is not required to wait for the MSRP 200 OK for chunk 2' of step 211 to execute step 212. Step 214 shows the B2BUA 200 sending an MSRP 200 OK to the originating end-point 100 to confirm reception of chunk 2. Similarly, step 214 can occur right after step 209.

Other embodiments could be used where the best end-point chunk size is less than (<) the best server chunk size (first server MSRP chunk size) in which case, the B2BUA 200 stores the received message chunks as they arrive, waits until all the message chunks are received before it re-segments the message towards the remote end-point 101 using the first server MSRP chunk size. Even if the best end-point chunk size is greater (>) the first server MSRP chunk size, the B2BUA 200 may, as an alternative to the illustrated embodiment in FIG. 2, store the received message chunks as they arrive, wait until all the message chunks are received, before it re-segments the message towards the remote end-point 101 using the first server MSRP chunk size also referred to as the best server chunk size.

Once the remote end-point 101 determines that all the chunks are received, it optionally sends a REPORT request to the B2BUA 200 to indicate successful delivery of the complete message as shown at step 215. The B2BUA 200 then sends a REPORT request to the originating end-point 100 to indicate successful delivery of the complete message as shown at step 216. When the MSRP session is terminated, the originating end-point 100 could then terminate the session by sending a SIP BYE message and receiving a SIP 200 OK from the B2BUA 200 as shown in bundled step 217. The B2BUA 200 then terminates the session by sending a SIP BYE message and receiving a SIP 200 OK from the remote end-point 101 as shown in bundled step 218.

Note that the originating end-point preferred chunk size, the first server MSRP preferred chunk sizes and the remote end-point preferred chunk size may indicate a maximum chunk size supported by each of the entities. Additionally, if a list of preferred chunk-size is used, it may indicate absolute chunk size values in which case they are listed in order of preference or priority. Optionally, the list may comprise two values indicating a minimum and a maximum chunk size hence providing an allowable range of chunk sizes.

Figure 3:
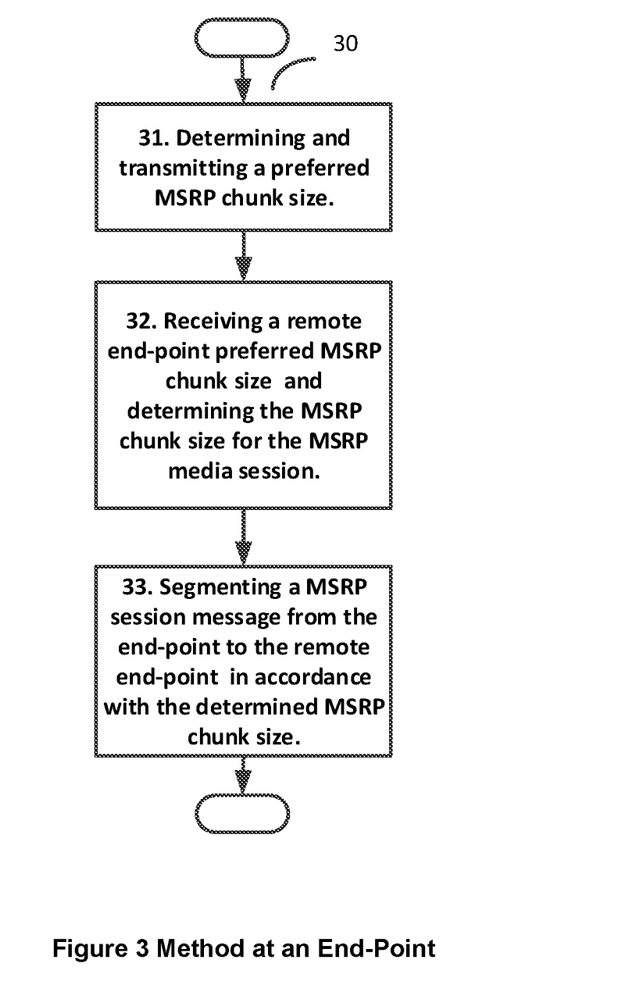
FIG. 3 is an exemplary embodiment of a method executed at an end-point negotiating MSRP chunk size.

FIG. 3 illustrates an embodiment of a method 30 executed at an end-point originating an instant message towards a remote end-point. The remote end-point may be the destination/recipient end-point for the MSRP messages, in which case the end-point and the remote being the destination/recipient end-point communicate directly. Alternatively, the remote end-point may be a server acting as an intermediary remote end-point towards the end-point. The server is used to communicate or inter-work with the destination/recipient remote end-point on behalf of the end-point. As such, all communications from the end-point to the destination end-point including the MSRP messages go through the server (e.g., B2BUA). Whether it is a server acting as an intermediary remote end-point or a destination/recipient end-point, it is herein referred to as a remote end-point.

At step 31, the end-point determines that an instant message, or file or content is to be sent in chunks and further determines a preferred chunk size for the message. The preferred chunk size is transmitted as an SDP offer in a SIP INVITE. In another embodiment, the end-point may instead send a list of preferred chunk sizes listed in order of preference or priority. In yet another embodiment, the end-point may send two chunk size values indicating a minimum and a maximum chunk size hence providing an allowable range of chunk sizes. The end-point determines the preferred chunk size at least partially based on criteria comprising: the end-point access network type, the end-point access network/access link conditions and/or internal configuration.

At step 32, the end-point receives an SDP answer in a SIP 200 OK from the remote end-point 101. If the remote end-point 101 supports negotiating the message chunk size, the SIP 200 OK comprises the remote end-point preferred chunk size. The remote end-point 101 may determine its preferred chunk size based on the remote end-point access network type, the remote end-point access network/access link conditions and/or internal configuration. Alternatively, the remote end-point 101 may instead include in the SDP answer, a list of preferred chunk sizes listed in order of preference or priority. In yet another embodiment, the remote end-point 101 may instead include in the SDP answer two chunk size values indicating a minimum and a maximum chunk size hence providing an allowable range of chunk sizes.

Once the end-point has received or the remote end-point preferred chunk size in the SDP answer, it determines the best chunk size to use for the MSRP session. An embodiment of the determination of the best chunk size is as follows:

If the end-point preferred chunk size is lower than the remote end-point preferred chunk size, the best chunk size is the end-point preferred chunk size.

If the remote end-point preferred chunk size is lower than the end-point preferred chunk size, and it can be supported by the end-point, the best chunk size is the remote end-point preferred chunk size.

if the remote end-point preferred chunk size is lower than the preferred end-point chunk size, and the end-point cannot support the remote end-point preferred chunk size, because the end-point is configured to only use some pre-configured MSRP chunk sizes, then the end-point selects the best chunk size to be the closest pre-configured MSRP chunk size that is lower than or the remote end-point preferred chunk size.

Further to the embodiments described above, if a remote end-point 101 does not support negotiation of the chunk size, the end-point should assume today's known behaviour, i.e., that there is no limit to the chunk size and it may use its own configured value or even its own determined preferred chunk size.

At step 33, MSRP session starts, where the end-point sends a SEND request comprising the first chunk of the complete message using the best chunk size for the session as determined above at step 32. The end-point could receive MSRP 200 OK from the remote end-point 101 to confirm receipt of the SEND request. The end-point proceeds by sending subsequent SEND requests comprising the subsequent message chunks until the complete message is sent and delivered. A Report message indicating success delivery may be received once the remote end-point 101 has received the complete message and reassembled all the chunks.

In one embodiment, during an active MSRP session, the end-point and/or the remote end-point 101 may move from one access network type to another access network type of different capacity, or the access network/access link conditions of one or both end-points have changed. When any of the aforementioned condition occurs, the end-point and/or the remote end-point 101 may send an updated SDP offer in a SIP RE-INVITE or SIP UPDATE during the ongoing MSRP session. The updated SDP offer would comprise an updated preferred chunk size value for one end-point and an SDP answer is returned which may comprise an updated preferred chunk size for the other end-point. The end-point sending a message may then make a new determination of the best chunk size value based on the updated preferred chunk size in the updated SDP offer/answer and continue the MSRP session with the new determined best chunk size value.

Figure 4:
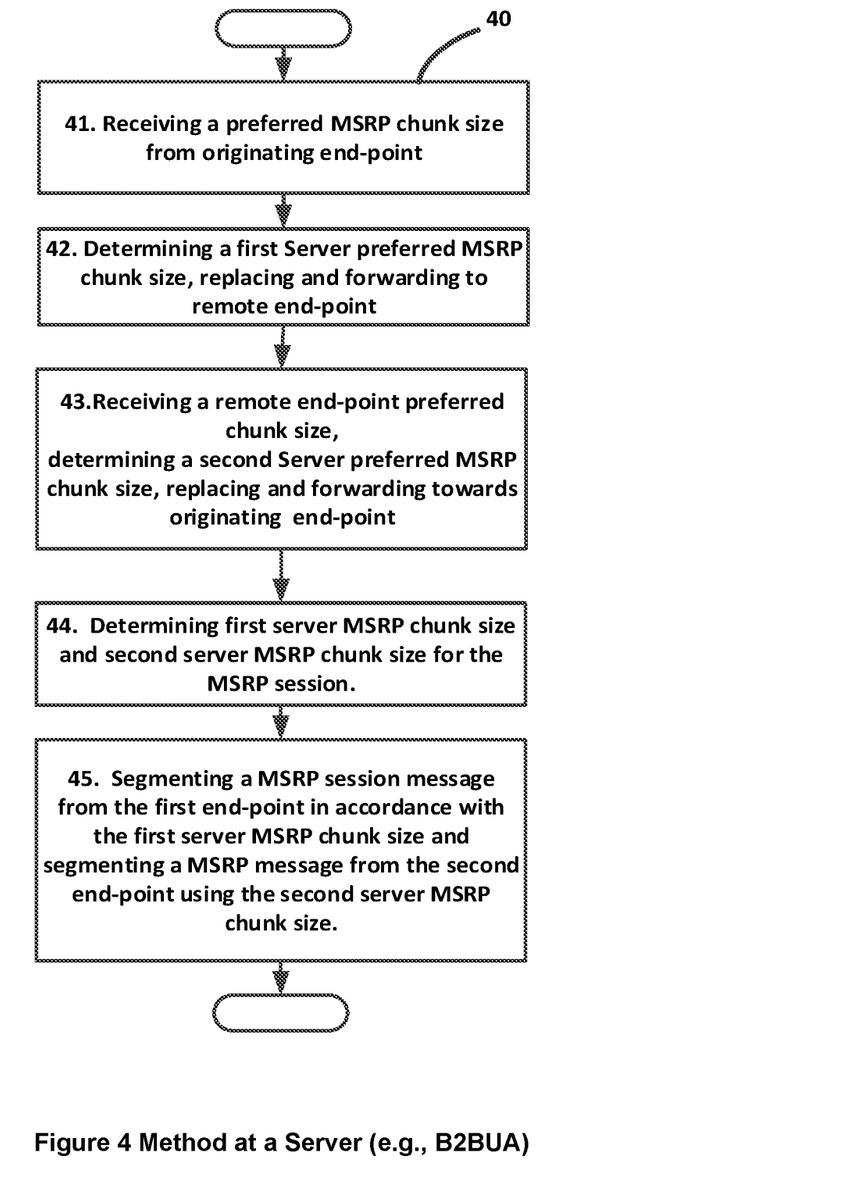
FIG. 4 is an exemplary embodiment of a method executed at a server for negotiating chunk size.

FIG. 4 illustrates an exemplary method 40 executed at a server 200 that relays or forwards instant messages from an originating end-point 100 to a remote end-point 101. The server 200 may be a B2BUA, a Relay or a message center that has the ability to establish an MSRP session between an originating end-point 100 and a remote end-point 101 and to re-segment the instant messages sent between the originating end-point 100 and the remote end-point 101, as required in accordance with defined or dynamic server criteria. The server 200 negotiates with each end-point the parameters of the MSRP session. The MSRP session establishment starts at step 41, when the server 200 receives an SDP offer in a SIP INVITE message, the SDP offer comprises the legacy MSRP parameters, e.g., path, Max Size, etc. and a new SDP attribute indicating the originating end-point preferred chunk size for the message as the message may be delivered in chunks from the originating end-point 100. The server 200, at step 42 determines the remote end-point 101 from the path parameter, determines the first server preferred MSRP chunk size towards the remote end-point 101. If the first server preferred MSRP chunk size is different from the received originating end-point preferred chunk size value, it further modifies the SIP INVITE message by replacing the new SDP attribute value in the received SDP offer indicating the originating end-point preferred chunk size with its own, i.e. the first server preferred MSRP chunk size. The server 200 then forwards the modified SIP INVITE with the SDP offer towards the remote end-point 101. At step 43, the server 200 receives an SDP answer in a SIP 200 OK from the remote end-point 101 which includes the legacy MSRP parameters and a new SDP parameter indicating the remote end-point preferred chunk size. Again the server 200 determines a second server preferred MSRP chunk size but this time towards the originating end-point 100. If the second server preferred MSRP chunk size is different from the remote end-point preferred chunk size value, it further modifies the SIP 200 OK where it replaces the new SDP attribute value in the SDP answer indicating the remote end-point preferred chunk size with its own, i.e., the second server preferred MSRP chunk size and forwards the modified SIP 200 OK with the SDP answer towards the originating end-point 100. If the second server preferred MSRP chunk size is identical to the remote end-point preferred chunk size, the server 200 may not replace the new SDP attribute value in the SDP answer indicating the remote end-point preferred chunk size with its own, i.e., the second server preferred MSRP chunk size.

In one embodiment, the server 200 determines the first server preferred MSRP chunk size and the second server preferred MSRP chunk size based on criteria comprising internal configuration or configured policies and/or service level agreements between the server 200 and the next node along the path, e.g., Network to Network Interconnect, NNI, or even User to Network Interconnect, UNI if the server 200 communicates directly with one or both end-points without other intermediary nodes.

At step 44 of FIG. 4, the server 200 determines a first server MSRP chunk size which is the best chunk size to use towards the remote end-point 101 for messages received from the originating end-point 100. The server 200 also determines a second server MSRP chunk size which is the best chunk size to use towards the originating end-point 100 for messages received on the other direction from the remote end-point 101 towards the originating end-point 100 over the same MSRP session. An embodiment of the determination of the first server MSRP chunk size is described. The same embodiment is applicable to the determination of the second server MSRP chunk size with the originating end-point 100:

If the first server preferred MSRP chunk size determined at step 42 is lower than the remote end-point preferred chunk size, the first server MSRP chunk size, which is the chunk size to be used between the server 200 and the remote end-point 101 is the first server preferred MSRP chunk size.

If the remote end-point preferred chunk size is lower than the first server preferred MSRP chunk size, and it can be supported by the server 200, the first server MSRP chunk size is the remote end-point preferred chunk size.

if the remote end-point preferred chunk size is lower than the first server preferred MSRP chunk size, and the server 200 cannot support the remote end-point preferred chunk size, because the server 200 is configured to only use some pre-configured MSRP chunk sizes, then the server 200 selects the first server MSRP chunk size (or the best chunk size) to be the closest pre-configured server MSRP chunk size that is lower than the remote end-point preferred chunk size.

Further to the embodiments described above, if the server 200 (e.g., B2BUA) and a remote end-point 101 cannot negotiate the chunk size, then the server 200 should assume today's known behaviour, i.e., there may be no limit to the chunk size and it may use its own configured value or even its own determined preferred chunk size for messages forwarded from the server 200 to the remote end-point 101. There may be situations where the server 200 (e.g., B2BUA) is able to negotiate the chunk size with the remote end-point 101 but not with the originating end-point 100, and vice versa. When negotiation of chunk size cannot be negotiated with either one of the end-point, the concerned end-point and the server 200 would use the default chunk size over the corresponding link as per prior art.

At step 45, the MSRP session is established. The server 200 uses the first server MSRP chunk size and the second server MSRP chunk size to transmit messages between the originating end-point 100 and the remote end-point 101. When the server 200 receives message chunks from the originating end-point 100, it may require to store all the message chunks until the complete message is received, then starts forwarding the message re-segmented according to first server MSRP chunk size towards the remote end-point 101. Alternatively, the server 200 may start forwarding the message re-segmented towards the remote end-point 101 as soon as it receives and stores enough message bytes or octets to allow re-segmenting according to the first server MSRP chunk size. In this later alternative, the server 200 may only need to store few chunks of the message and does not need to wait for the complete message to be received and stored from the originating end-point 100 before it starts forwarding to the remote end-point 101.

For example, if the message chunk size used in the MSRP SEND request from the originating end-point 100 is smaller than the first server MSRP chunk size, the server 200 stores the message chunk and waits for more message chunks to arrive from the originating end-point 100 before it starts to forward and re-segment to the remote end-point 101 according to the first server MSRP chunk size Step 45 of Method 40 is equally executed for messages received from the remote end-point 101, where the message chunks are re-segmented on the opposite direction towards the originating end-point 100 according to the second MSRP chunk size.

Furthermore, it may be possible for the originating end-point 100 and/or the remote end-point 101 to update at any time their corresponding preferred MSRP chunk size during an ongoing MSRP session. The end-points may at any time send an SDP offer in either a SIP RE-INVITE or a SIP UPDATE message. This may occur if for instance the network/link conditions have changed or one of the end-points or both have moved to a different access network type of different capacity where perhaps different bandwidth policies may apply. If however the server 200 that receives the updated SDP offer from one end-point determines that it should maintain its previously determined first server preferred MSRP chunk size or second server preferred MSRP chunk size it responds to the end-point and does not forward the SDP offer to the other end-point.

The following embodiment illustrates a format of the new SDP attribute comprised in an SDP offer and an SDP answer, when the attribute is used to carry a preferred chunk size. An example of the definition and syntax of the attribute is as follows:

SDP a-line attribute "a=chunk-size:" which can take a value in Kbytes starting from for example 100 Kilobytes.

The chunk-size may be the maximum chunk-size.

For backward compatibility with RFC4975, an endpoint that is not receiving the MSRP chunk size attribute in the SDP offer or SDP answer, should assume today's behavior i.e. that there is no limit to the chunk size and it may use its own configured value.

An Augmented Backus-Naur Form, ABNF, syntax for the new SDP attribute could be:

chunk-size=chunk-size-label ":" chunk-size-value
chunk-size-label="chunk-size"
chunk-size-value=1*(DIGIT); chunk size in Kilobytes Similar embodiments can be used when the attribute is used to carry a list of preferred chunk sizes listed in order of preference or priority. Alternatively the attribute can be formatted to carry a Minimum value and a Maximum value for the preferred chunk size.

Figure 5:
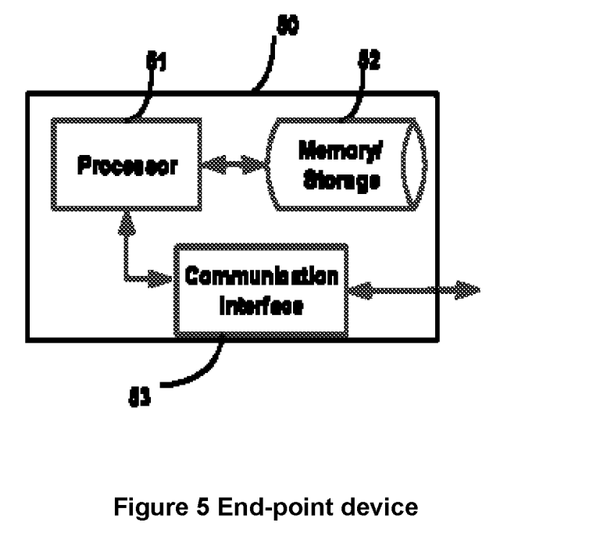
FIG. 5 is a schematic illustration of an end-point, according to an embodiment.

An embodiment illustrated in FIG. 5 shows an end-point comprising a circuitry 50 which executes the method steps according to the embodiments as described in FIG. 1 and FIG. 3 in addition to other embodiments described herein. In one embodiment, the circuitry 50 may comprise a processor 51 and a storage 52 (also referred to as memory) containing instructions, which when executed, cause the processor 51 to perform the steps in a method according to embodiments described herein. The circuitry 50 may further comprise a communication interface 53 to communicate with external entities.

Figure 6:
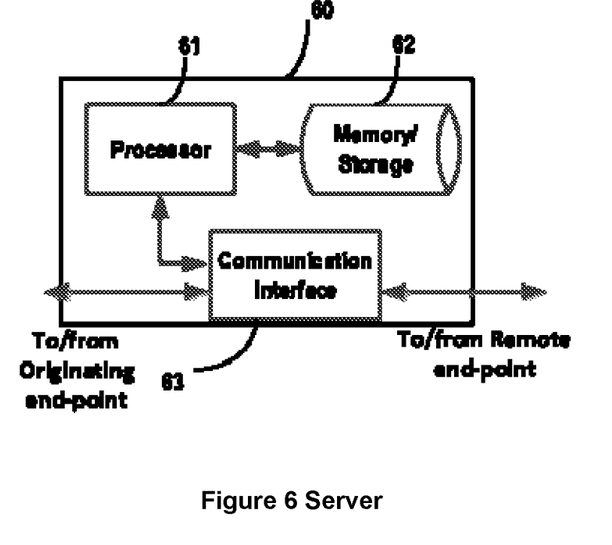
FIG. 6 is a schematic illustration of a server, according to an embodiment.

An embodiment illustrated in FIG. 6 shows a server 200 comprising a circuitry 60 which executes the method steps according to the embodiments as described in FIG. 2 and FIG. 4 in addition to other embodiments described herein. In one embodiment, the circuitry 50 may comprise a processor 61 and a storage 62 (also referred to as memory) containing instructions, which when executed, cause the processor 61 to perform the steps in a method according to embodiments described herein. The circuitry 60 may further comprise a communication interface 63 to communicate with external entities and end-points.

Figure 7:
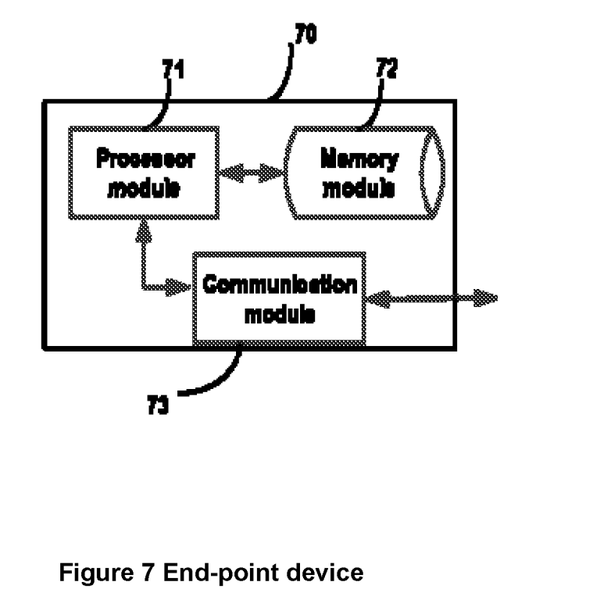
FIG. 7 is a schematic illustration of an end-point, according to another embodiment.

Another embodiment of an end-point is illustrated in FIG. 7. FIG. 7 illustrates a circuitry 70 comprising a processing module 71 configured to determine a preferred MSRP chunk size for a MSRP session and transmit through a communication module 73 a message that includes the preferred MSRP chunk size of the end-point. The message may be a SIP-INVITE message. The processing module 71 is further configured to receive a response message through the communication module 73, where the response message includes a remote end-point preferred MSRP chunk size. The processing module 71 is configured to determine an MSRP chunk size to be used for the MSRP media session. When sending MSRP session message to the remote end-point through the communication module 73, the processing module 71 is further configured to segment the MSRP session message in accordance with the determined MSRP chunk size that is stored in a memory module (72) the MSRP chunk size.

The circuitry 70 in FIG. 7 further comprises the communication module 73 configured to send and receive the communication messages used to establish the MSRP session and negotiate the MSRP chunk size for the MSRP session between the end-points. The communication module 73 is further configured to send segmented MSRP session messages that are segmented according the determined MSRP chunk size. The communication module 73 is further configured to receive MSRP session messages from the remote end-point which may be segmented according to the remote end-point determined MSRP chunk size. The memory module 72 maintains the determined MSRP chunk size by the end-point that is used to segment MSRP messages from the end-point to the remote end-point.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

What is claimed is:

1. A method of negotiating Message Session Relay Protocol, MSRP, chunk size to be used in an MSRP session between an end-point and a remote end-point, and executed at the end-point, the method comprising:
   determining a maximum MSRP chunk size for a MSRP session and transmitting, to the remote end-point, a message including the maximum MSRP chunk size;
   receiving a response message comprising the remote end-point maximum MSRP chunk size and determining an MSRP chunk size to be used for the MSRP media session based on the maximum MSRP chunk size and the remote end-point maximum MSRP chunk size; and
   segmenting a MSRP session message from the end-point in accordance with the determined MSRP chunk size.

2. The method of claim 1, wherein responsive to determining the remote end-point maximum MSRP chunk size is smaller than the maximum MSRP chunk size, and is not supported by the end-point, selecting a configured MSRP chunk size that is lower than the remote end-point maximum MSRP chunk size.

3. The method of claim 1, wherein the MSRP chunk size is determined in accordance with the maximum MSRP chunk size and the remote end-point maximum MSRP chunk size.

4. The method of claim 1, wherein the step of determining the maximum MSRP chunk size is based at least partially on at least one of the access network type in use, the local UE configuration and the UE capability.

5. The method of claim 1, wherein transmitting a message comprising the maximum MSRP chunk size further comprises sending a Session Initiation Protocol, SIP, message comprising an SDP attribute indicating the maximum MSRP chunk size.

6. The method of claim 1, wherein determining an MSRP chunk size for the MSRP media session further comprises identifying a smaller of the maximum MSRP chunk size and the remote end-point maximum MSRP chunk size.

7. A method of negotiating Message Session Relay Protocol, MSRP, chunk size to be used in an MSRP session established between end-points through a server, and executed at the server, the method comprising:
   receiving from a first end-point a first message comprising a first end-point maximum MSRP chunk size;
   determining a first server maximum MSRP chunk size, modifying the first message to replace the first end-point preferred MSRP chunk size with the first server maximum MSRP chunk size and forwarding the modified first message towards a second end-point;
   receiving a second message from the second end-point comprising a second end-point maximum MSRP chunk size;
   determining a second server maximum MSRP chunk size, modifying the second message to replace the second end-point maximum MSRP chunk size with the second server maximum MSRP chunk size and forwarding the modified second message towards the first end-point;
   determining a first server MSRP chunk size and a second server MSRP chunk size for the MSRP session; and
   segmenting a MSRP session message from the first end-point in accordance with the first server MSRP chunk size and segmenting a MSRP message from the second end-point using the second server MSRP chunk size.

8. The method of claim 7, wherein determining the first server maximum MSRP chunk size and the second server maximum MSRP chunk size is based at least partially on at least one of a local policy and a service level agreement between the server and a peer network node along a communication path.

9. The method of claim 7, wherein determining the first server MSRP chunk size is based on the second end-point maximum MSRP chunk size and the first server maximum MSRP chunk size.

10. The method of claim 7, wherein determining the second server MSRP chunk size is based on the first end-point maximum MSRP chunk size and the second server maximum MSRP chunk size.

11. The method of claim 7, wherein determining the first server MSRP chunk size comprises identifying a smaller of the first server maximum MSRP chunk size and the second end-point maximum MSRP chunk size.

12. The method of claim 7, wherein determining the second server MSRP chunk size comprises identifying a smaller of the second server maximum MSRP chunk size and the first end-point maximum MSRP chunk size.

13. An end-point device configured to negotiate Message Session Relay Protocol, MSRP, chunk size to be used in an MSRP session between the end-point device and a remote end-point device, the end-point device comprising a circuitry configured to:
   determine a maximum MSRP chunk size for a MSRP session and transmit, to the remote end-point device, a message comprising the maximum MSRP chunk size;
   receive a response message comprising the remote end-point device maximum MSRP chunk size and determine an MSRP chunk size to be used for the MSRP session based on the maximum MSRP chunk size and the remote end-point device maximum MSRP chunk size; and segment a MSRP session message from the end-point device in accordance with the determined MSRP chunk size.

14. The end-point device of claim 13, wherein the circuitry comprises a processor, a communication interface and a memory, the memory containing instructions executable by the processor.

* * * * *